(12) United States Patent
Amano

(10) Patent No.: US 8,179,607 B2
(45) Date of Patent: May 15, 2012

(54) PROJECTION ZOOM LENS AND PROJECTION-TYPE DISPLAY APPARATUS

(75) Inventor: Masaru Amano, Saitama (JP)

(73) Assignee: Fujifilm Corporation, Tokyo (JP)

( * ) Notice: Subject to any disclaimer, the term of this patent is extended or adjusted under 35 U.S.C. 154(b) by 165 days.

(21) Appl. No.: 12/795,399

(22) Filed: Jun. 7, 2010

(65) Prior Publication Data

US 2010/0309562 A1    Dec. 9, 2010

(30) Foreign Application Priority Data

Jun. 8, 2009    (JP) .............................. P2009-137514

(51) Int. Cl.
*G02B 9/00*    (2006.01)
*G02B 15/14*    (2006.01)
(52) U.S. Cl. .......................... 359/650; 359/649; 359/682
(58) Field of Classification Search .......... 359/681–682, 359/649–650
See application file for complete search history.

(56) References Cited

U.S. PATENT DOCUMENTS

| | | | | |
|---|---|---|---|---|
| 7,576,921 B2 * | 8/2009 | Inoko | ............................. | 359/649 |
| 7,911,705 B2 * | 3/2011 | Masui | ............................ | 359/651 |
| 2005/0036207 A1 | 2/2005 | Yamasaki et al. | | |
| 2008/0231962 A1 | 9/2008 | Yamada | | |

FOREIGN PATENT DOCUMENTS

| | | |
|---|---|---|
| JP | 2005-62226 A | 3/2005 |
| JP | 2008-46259 A | 2/2008 |

* cited by examiner

*Primary Examiner* — Ricky Mack
*Assistant Examiner* — Zachary Wilkes
(74) *Attorney, Agent, or Firm* — Birch, Stewart, Kolasch & Birch, LLP

(57) ABSTRACT

A projection zoom lens projects an optical image of rays, which are irradiated from a light source onto a light valve and are modulated by a predetermined image displayed on the light valve, onto a screen. The projection zoom lens includes a plurality of lens groups that is formed as a telecentric system on the reduction side thereof and includes at least two movable lens groups which are movable during zooming. In the projection zoom lens, the plurality of lens groups is arranged to include, in order from a magnification side, at least a first lens group and a second lens group. The first lens group has a negative refractive power, remains stationary during zooming, and performs focusing. The second lens group has a negative refractive power and remains stationary during zooming and focusing.

10 Claims, 10 Drawing Sheets

EXAMPLE 1(WIDE)

EXAMPLE 1 (WIDE)

EXAMPLE 1

FIG.3 EXAMPLE 2(WIDE)

FIG.4 EXAMPLE 2

EXAMPLE 1 (WIDE)

FIG.6 EXAMPLE 3

EXAMPLE 3

PROJECTION ZOOM LENS AND PROJECTION-TYPE DISPLAY APPARATUS

CROSS-REFERENCE TO RELATED APPLICATIONS

This application is based upon and claims the benefit of priority from the Japanese Patent Application No. 2009-137514 filed on Jun. 8, 2009; the entire contents of which are incorporated herein by reference.

BACKGROUND OF THE INVENTION

1. Field of the Invention

The present invention relates to a projection zoom lens provided in projection-type display apparatuses and the like and a projection-type display apparatus equipped with the projection zoom lens.

2. Description of the Related Art

In recent years, projection-type display apparatuses, which use various light valves such as transmissive and reflective liquid crystal display apparatuses and DMD display apparatuses and have a relatively long back focal length, have come into widespread use, and have been improved in performance.

Such high-performance projection-type display apparatuses employ a configuration using three reflective liquid crystal display devices or three DMDs, in which the longer back focal length is necessary to insert a color synthesis prism and a favorable telecentricity is demanded.

Further, as the resolution of the light valve increases, improvement in the resolving power of the projection lens becomes more necessary, and thus a problem arises in that, as the chromatic aberration thereof deteriorates, the resolving power thereof deteriorates.

In the past, there was a known zoom lens, which has a large back focal length while securing telecentricity on the reduction side thereof, disclosed in JP-A-2005-62226 and JP-A-2008-46259.

SUMMARY OF THE INVENTION

However, in the description disclosed in JP-A-2005-62226, since astigmatism is too large, when a high-resolution light valve is used, there is a problem in that aberration correction is insufficient.

Further, in the description disclosed in the JP-A-2008-46259, there is a problem in that the lateral chromatic aberration is insufficiently reduced.

The invention has been made in view of the above-mentioned situation. It is desirable to provide a high-resolution projection zoom lens capable of sufficiently correcting various aberrations in the entire zooming range while securing a sufficiently long back focal length, and it is also desirable to provide a projection-type display apparatus equipped with the projection zoom lens.

According to a first aspect of an embodiment of the invention, a projection zoom lens is characterized as follows.

The projection zoom lens projects an optical image of rays, which are irradiated from a light source onto a light valve and are modulated by a predetermined image displayed on the light valve, onto a screen.

The projection zoom lens includes a plurality of lens groups that is formed as a telecentric system on the reduction side thereof and includes at least two movable lens groups which are movable during zooming.

The plurality of lens groups is arranged to include, in order from a magnification side, at least a first lens group and a second lens group. The first lens group has a negative refractive power, remains stationary during zooming, and performs focusing. The second lens group has a negative refractive power and remains stationary during zooming and focusing.

Further, according to a second aspect based on the first aspect of the invention, the projection zoom lens is characterized as follows.

It is preferable that the plurality of lens groups should include, in order from the second lens group toward the reduction side, a third lens group, a fourth lens group, a fifth lens group and a sixth lens group. The third lens group has a positive refractive power and is movable along the optical axis during zooming. The fourth lens group has a positive refractive power and is movable along the optical axis during zooming. The fifth lens group has a positive or negative refractive power and is movable along the optical axis during zooming. The sixth lens group has a positive refractive power and remains stationary during zooming.

Furthermore, according to a third aspect based on the second aspect of the invention, the projection zoom lens is characterized as follows.

It is preferable that the third lens group, the fourth lens group, and the fifth lens group should be movable from the reduction side to the magnification side during zooming from the wide-angle end to the telephoto end.

Further, according to a fourth aspect based on any one of the first to third aspects, the projection zoom lens is characterized as follows.

It is preferable that the projection zoom lens should satisfy the following Conditional Expression (1).

$$-7.0 < f_2/fw < -2.0 \quad (1)$$

Here, fw is a focal length of the whole lens system at the wide-angle end, and $f_2$ is a focal length of the second lens group.

Further, according to a fifth aspect based on any one of the first to fourth aspects, the projection zoom lens is characterized as follows.

It is preferable that the projection zoom lens should satisfy the following Conditional Expression (2).

$$1.5 < Bf/fw < 4.0 \quad (2)$$

Here, fw is the focal length of the whole lens system at the wide-angle end, and Bf is the back focal length of the whole lens system (air conversion distance).

Further, according to a sixth aspect based on any one of the second to fifth aspects, the projection zoom lens is characterized as follows.

It is preferable that the fourth lens group should be formed of a single biconvex lens, and should satisfy the following Conditional Expression (3).

$$70 < vd4 \quad (3)$$

Here, vd4 is the Abbe number of the biconvex lens constituting the fourth lens group at the d-line.

Further, according to a seventh aspect based on any one of the first to sixth aspects, the projection zoom lens is characterized as follows.

It is preferable that the projection zoom lens should satisfy the following Conditional Expression (4).

$$70 < vd5 \quad (4)$$

Here, vd5 is the Abbe number of a positive lens convex toward the reduction side in the fifth lens group at the d-line.

Further, according to an eighth aspect based on any one of the second to seventh aspects, the projection zoom lens is characterized as follows.

It is preferable that, in the entire zooming range, an aperture, which remains stationary during zooming so as to keep the F number constant, should be disposed between the fourth lens group and the fifth lens group.

Further, according to a ninth aspect based on any one of the second to seventh aspects, the projection zoom lens is characterized as follows.

It is preferable that, in the entire zooming range, an aperture, which is independently movable so as to keep the F number constant, should be disposed between the fourth lens group and the fifth lens group.

According to another embodiment of the invention, a projection-type display apparatus includes a light source, a light valve, an illumination optical unit, and the projection zoom lens according to any one of the above mentioned aspects. The illumination optical unit guides rays originating from the light source into the light valve. The projection zoom lens is telecentric on the reduction side thereof. In the apparatus, the rays originated from the light source are optically modulated by the light valve, and are projected onto a screen by the projection zoom lens.

Furthermore, the "magnification side" means the projected side (the screen side), and even in the case of reduction projection, the screen side is referred to as the magnification side for convenience of description. On the other hand, the "reduction side" means an original image display region side (the light valve side), and even in the case of reduction projection, the light valve side is referred to as the reduction side.

The projection zoom lens according to the first aspect and the projection-type display apparatus using the same are realized by using the following configuration. The projection zoom lens includes a plurality of lens groups that is formed as a telecentric system on the reduction side thereof and includes at least two movable lens groups which are movable during zooming. The plurality of lens groups is arranged to include, in order from a magnification side, at least a first lens group that has a negative refractive power, remains stationary during zooming, and performs focusing, and a second lens group that has a negative refractive power and remains stationary during zooming and focusing.

Specifically, the projection zoom lens according to the embodiment of the invention has the following advantages by making the powers of the first and second lens groups be negative. The negative powers can be distributed to the two lens groups, and it is possible to decrease the negative power of the first lens group. As a result, it is possible to suppress the fluctuation in aberration caused by the focusing. Besides, this configuration is advantageous in correction of off-axis aberrations such as comatic aberration and image field curvature.

Further, in the arrangement area of the second lens group, the off-axis rays pass through relatively high position. As a result, it is possible to correct various aberrations such as lateral chromatic aberration efficiently.

Furthermore, the second lens group is formed as a fixed lens group in any case of zooming and focusing. Thereby, it is possible to reduce the number of components. As a result, it is possible to suppress an increase in cost.

With such a configuration, it is possible to provide, with low cost, a high-resolution projection zoom lens capable of sufficiently correcting various aberrations in the entire zooming range while securing a sufficiently long back focal length, and it is also desirable to provide a projection-type display apparatus equipped with the projection zoom lens.

DESCRIPTION OF THE PREFERRED EMBODIMENTS

Figure 1:
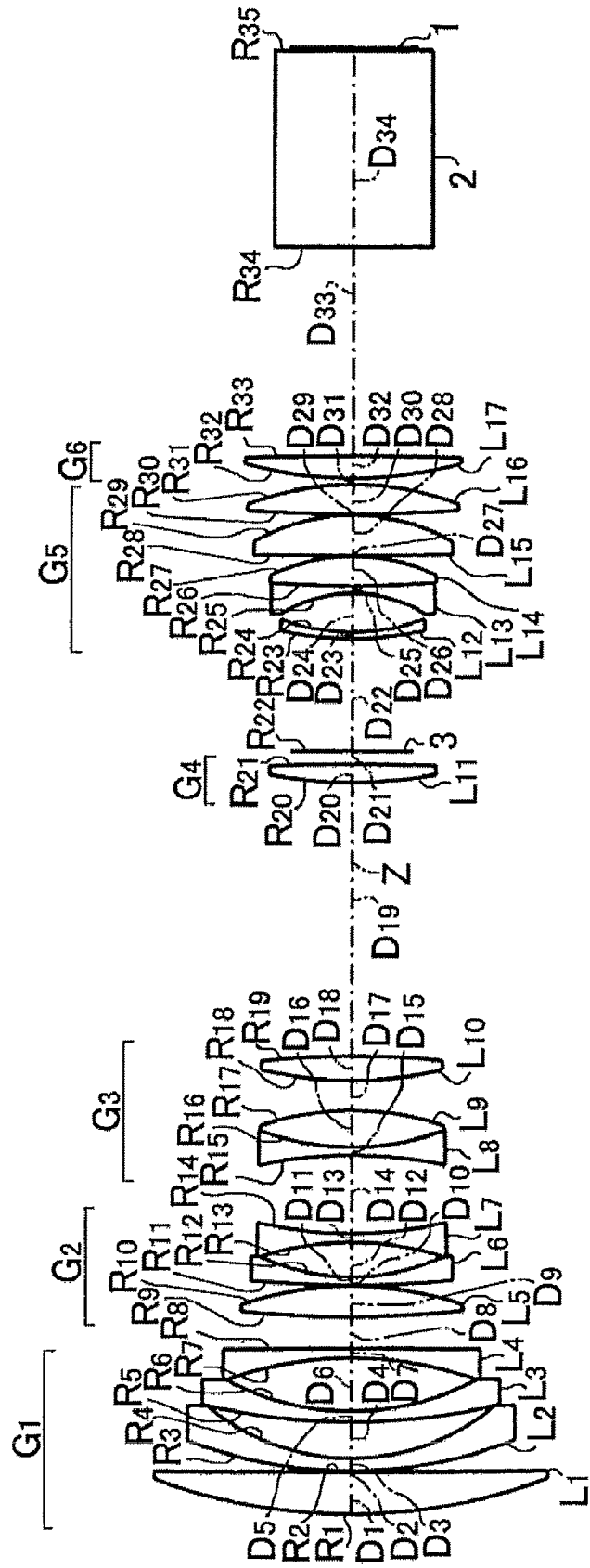
FIG. 1 is a lens configuration diagram illustrating a projection zoom lens according to Example 1.

Hereinafter, an embodiment of the invention will be described with reference to the accompanying drawings. FIG. 1 is a lens configuration diagram illustrating a zoom lens at the wide-angle end according to Example 1 of the invention. Hereinafter, the lens is described as a representative example of the embodiment.

Specifically, the lens is used as a projection zoom lens provided in a projection-type display apparatus. As an example, the projection zoom lens includes, in order from the magnification side: a first lens group $G_1$ that has a negative refractive power, remains stationary during zooming, and performs focusing; and a second lens group $G_2$ that has a negative refractive power and remains stationary during zooming and focusing; a third lens group $G_3$ that has a positive refractive power and is movable along the optical axis Z during zooming; a fourth lens group $G_4$ that has a positive refractive power and is movable along the optical axis Z during zooming; a fifth lens group $G_5$ that has a positive refractive power and is movable along the optical axis Z during zooming; and a sixth lens group $G_6$ that has a positive refractive power and remains stationary during zooming.

Further, it is preferable that the third lens group $G_3$, the fourth lens group $G_4$, and the fifth lens group $G_5$ should be movable from the reduction side to the magnification side during zooming from the wide-angle end to the telephoto end.

Furthermore, it is preferable that in the entire zooming range, an aperture, which remains stationary during zooming so as to keep the F number constant, should be disposed between the fourth lens group $G_4$ and the fifth lens group $G_5$. Alternatively, it is also preferable that in the entire zooming range, the aperture, which is independently movable so as to keep the F number constant, is disposed between the fourth lens group $G_4$ and the fifth lens group $G_5$.

Further, the lens is configured to be substantially telecentric on the reduction side (a telecentric system).

Furthermore, as shown in the drawing, the first lens group $G_1$ is formed of four lenses $L_1$ to $L_4$, the second lens group $G_2$ is formed of three lenses $L_5$ to $L_7$, the third lens group $G_3$ is formed of three lenses $L_8$ to $L_{10}$ (in Example 3, two lenses), the fourth lens group $G_4$ is formed of a single lens $L_{11}$, the fifth lens group $G_5$ is formed of five lenses $L_{12}$ to $L_{16}$, and the sixth lens group $G_6$ is formed of a single lens $L_{17}$.

With such a configuration, even when it is necessary to change the projection distance in accordance with the projection space, it is possible to perform the zooming operation by moving the third lens group $G_3$, the fourth lens group $G_4$, and the fifth lens group $G_5$ along the direction of the direction of the optical axis Z. In addition, by making the variable aperture stop 3 stationary and performing the zooming operation, it possible to project a fine image as required onto the screen with the uniform brightness.

Further, the focusing is performed by moving the entirety of the first lens group $G_1$ in the direction of the optical axis Z.

Furthermore, the sixth lens group $G_6$ is a relay lens that remains stationary during zooming. Between the sixth lens group $G_6$ and the image display surface 1 as a light valve, a color synthesis prism 2 (which includes various filters such as a low pass filter (hereinafter the same)) is disposed.

Further, it is preferable that the projection zoom lens according to the embodiment should satisfy the following Conditional Expression (1):

$$-7.0 < f_2/fw < -2.0 \tag{1},$$

where fw is the focal length of the whole lens system at the wide-angle end, and $f_2$ is the focal length of the second lens group $G_2$.

The Conditional Expression (1) defines the power of the second lens group $G_2$. When the upper limit of the range is exceeded, the negative power of the second lens group $G_2$ excessively increase, and thus the negative power of the first lens group $G_1$ excessively decreases. Accordingly, the amount of movement of the first lens group $G_1$ resulting from the focusing increases, and thus the fluctuation in aberration excessively increases. As a result, it is difficult to secure a desirable back focal length. In contrast, when the lower limit of the range is exceeded, the negative power of the second lens group $G_2$ excessively decreases. As a result, when the second lens group $G_2$ is made to remain stationary during zooming, it is difficult to correct aberrations sufficiently.

From this point of view, it is more preferable that instead of the Conditional Expression (1), the following Conditional Expression (1') should be satisfied.

$$-6.5 < f_2/fw < -2.0 \tag{1'}$$

Further, it is further more preferable that instead of the Conditional Expression (1'), the following Conditional Expression (1") should be satisfied.

$$-6.0 < f_2/fw < -2.5 \tag{1"}$$

Further, it is preferable that the projection zoom lens according to the embodiment should satisfy the following Conditional Expression (2):

$$1.5 < Bf/fw < 4.0 \tag{2}$$

where fw is the focal length of the whole lens system at the wide-angle end, and Bf is the back focal length of the whole lens system (air conversion distance).

The Conditional Expression (2) defines the back focal length.

Specifically, when the upper limit of the range of the Conditional Expression (2) is exceeded, the size of the lens system increases, and this is not preferable. In contrast, when the lower limit of the range is exceeded, it is difficult to insert the color synthesis section such as the color synthesis prism between the zoom lens and the light valve.

From this point of view, it is more preferable that instead of the Conditional Expression (2), the following Conditional Expression (2') should be satisfied.

$$2.0 < Bf/fw < 3.5 \tag{2'}$$

Further, in the projection zoom lens according to the embodiment, it is preferable that the fourth lens group should be formed of a single biconvex lens, and should satisfy the following Conditional Expression (3):

$$70 < vd4 \tag{3},$$

where vd4 is the Abbe number of the biconvex lens constituting the fourth lens group $G_4$ at the d-line.

Further, it is preferable that the projection zoom lens according to the embodiment should satisfy the following Conditional Expression (4).

$$70 < vd5 \tag{4},$$

where vd5 is the Abbe number of a positive lens convex toward the reduction side in the fifth lens group $G_5$ at the d-line.

That is, the Conditional Expressions (3) and (4) define the Abbe numbers of the biconvex lens, which constitutes the fourth lens group $G_4$, and the positive lens which is convex toward the reduction side in the fifth lens group $G_5$ at the d-line.

By satisfying the Conditional Expression (3) or the Conditional Expression (4), it is possible to satisfactorily correct chromatic aberrations, particularly, lateral chromatic aberration.

Figure 10:
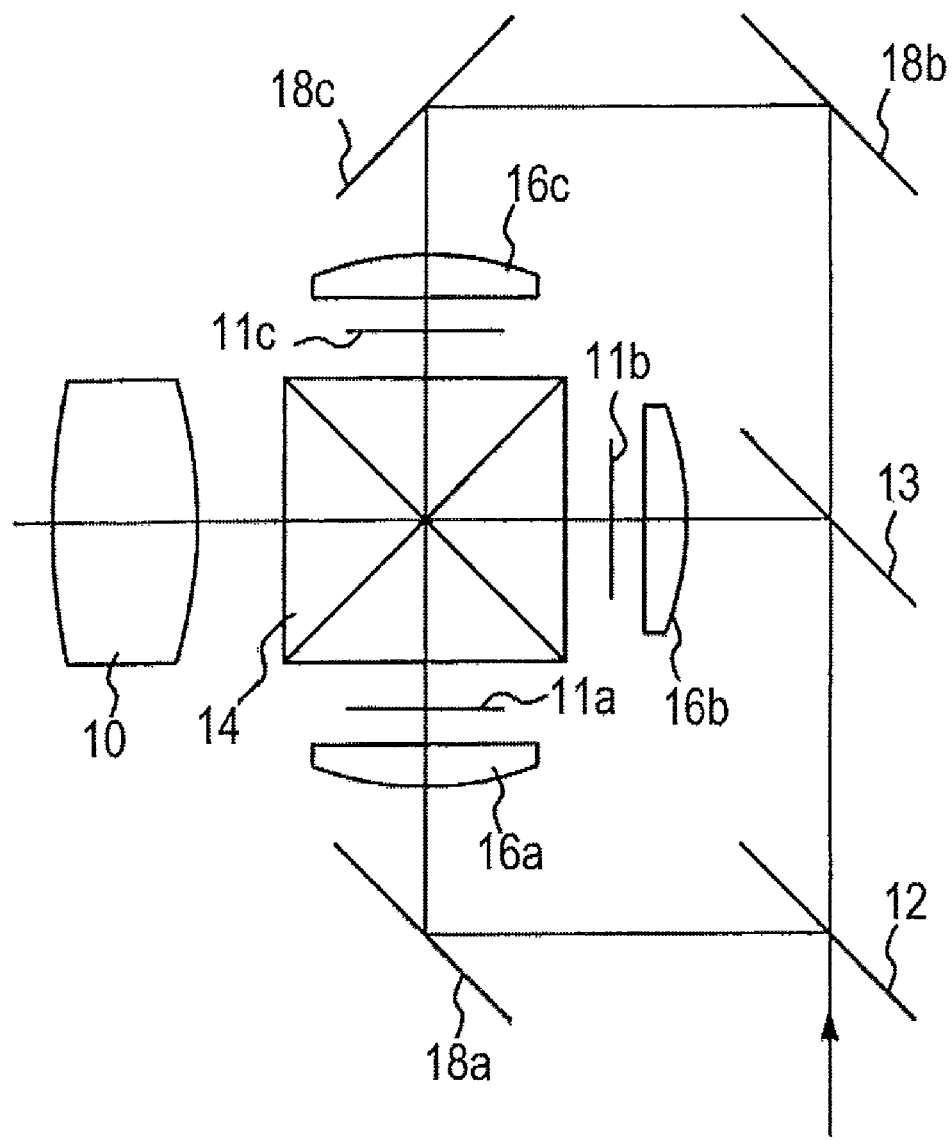
FIG. 10 is a schematic diagram illustrating a part of a projection-type display apparatus according to the embodiment.

Next, a projection-type display apparatus according to an embodiment of the invention will be briefly described. FIG. 10 is a schematic configuration diagram of the projection-type display apparatus according to the embodiment.

The projection-type display apparatus shown in FIG. 10 has transmissive liquid crystal panels 11a to 11c as light valves, and employs the aforementioned projection zoom lens system according to the embodiment as a projection zoom lens system 10. Further, between a light source 20 and a dichroic mirror 12, there is disposed an integrator (not shown in the drawing) such as a fly-eye. From the light source 20, white rays travel through an illumination optical unit, are modulated by being incident on the liquid crystal panels 11a to 11c which correspond to three color rays (G light, B light, R light), are color-synthesized by a cross dichroic prism 14, and are projected by the projection zoom lens system 10 on a screen not shown in the drawing. The device includes dichroic mirrors 12 and 13 for color separation, a cross dichroic prism 14 for color synthesis, condenser lenses 16a to 16c, and total reflection mirrors 18a to 18c. The projection-type display apparatus employs the projection zoom lens system according to the embodiment, and thus it is possible to embody a wide-angle and compact projection-type display apparatus capable of projecting a fine and bright projection image.

Furthermore, the projection-type display apparatus shown in FIG. 10 is for describing the embodiment of the invention, and may be modified into various forms. For example, as the light valve, instead of the transmissive liquid crystal panel, the reflective liquid crystal panel or the DMD may be used.

EXAMPLES

Hereinafter, the projection zoom lens system according to the invention will be further described with reference to specific examples. Furthermore, in the following numerical data such as R and D, the focal length at the wide-angle end is normalized by 1.

Example 1

The projection zoom lens system according to Example 1 has a configuration shown in FIG. 1 as described above. Specifically, in the lens, the first lens group $G_1$ includes, in order from the magnification side: the first lens $L_1$ formed as a positive meniscus lens convex toward the magnification side; the second lens $L_2$ formed as a negative meniscus lens convex toward the magnification side; the third lens $L_3$ formed as a negative meniscus lens convex toward the magnification side; and the fourth lens $L_4$ formed as a negative meniscus lens convex toward the reduction side. The second lens group $G_2$ includes, in order from the magnification side: the fifth lens $L_5$ formed as a biconvex lens; the sixth lens $L_6$ formed as a negative meniscus lens convex toward the magnification side; and the seventh lens $L_7$ formed as a biconcave lens.

Further, the third lens group $G_3$ includes, in order from the magnification side: the eighth lens $L_8$ formed as a biconcave lens; the ninth lens $L_9$ formed as a biconvex lens; and the tenth lens $L_{10}$ formed as a biconvex lens. The eighth lens $L_8$ and the ninth lens $L_9$ are cemented to each other so as to be formed as a cemented lens.

Further, the fourth lens group $G_4$ includes only the eleventh lens $L_{11}$ formed as a biconvex lens. The fifth lens group $G_5$ includes, in order from the magnification side: the twelfth lens $L_{12}$ formed as a negative meniscus lens convex toward the magnification side; the thirteenth lens $L_{13}$ formed as a biconvex lens; the fourteenth lens $L_{14}$ formed as a biconvex lens; the fifteenth lens $L_{15}$ formed as a biconvex lens; and the sixteenth lens $L_{16}$ formed as a biconvex lens. The thirteenth lens $L_{13}$ and the fourteenth lens $L_{14}$ are cemented to each other so as to be formed as a cemented lens.

Further, the sixth lens group $G_6$ includes only the seventeenth lens $L_{17}$ formed as a biconvex lens.

Figure 2:
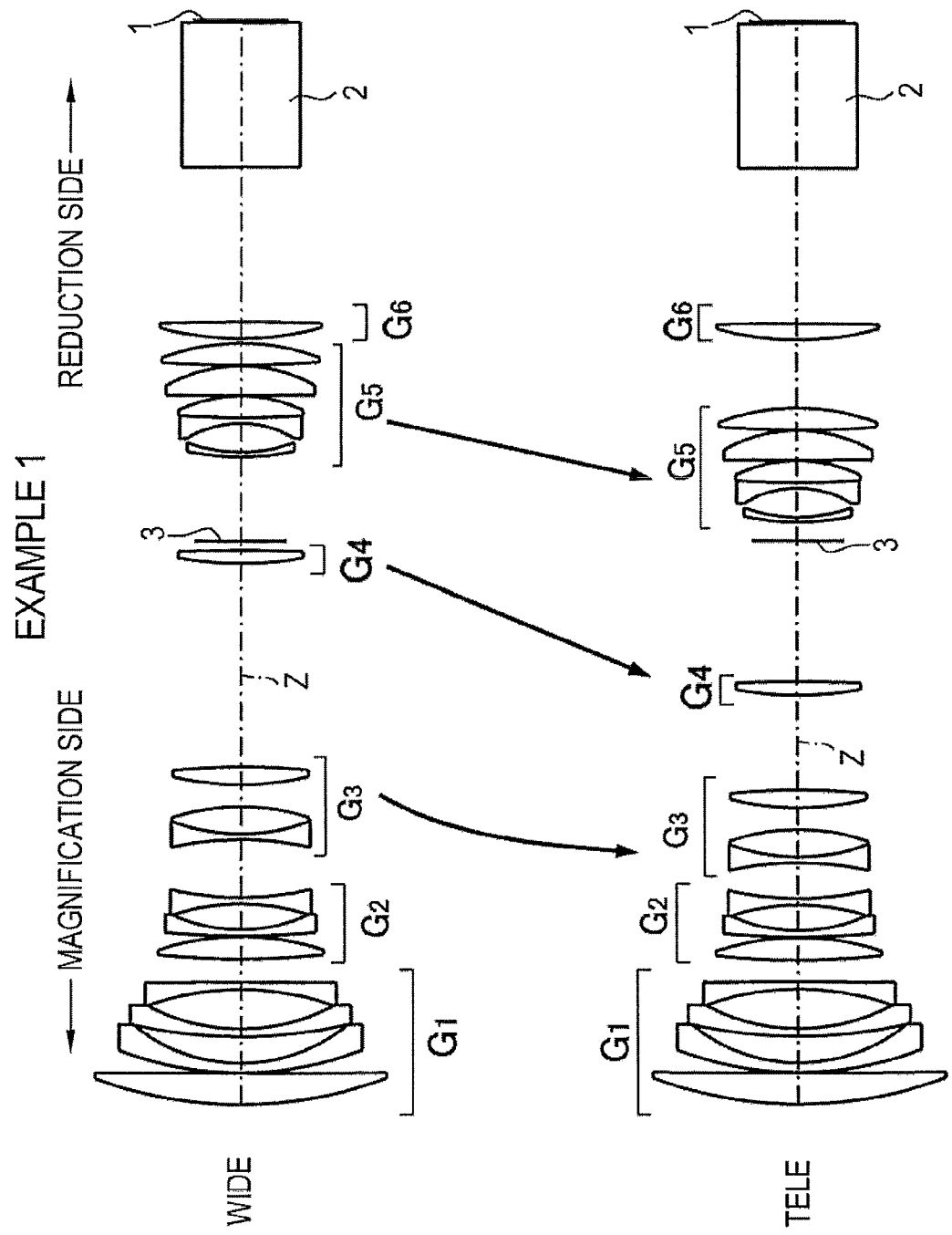
FIG. 2 is a diagram illustrating moved positions of lens groups of the projection zoom lens according to Example 1, at the wide-angle end (WIDE) and the telephoto end (TELE)

FIG. 2 shows moved positions of the lens groups at the wide-angle end (WIDE) and the telephoto end (TELE) in the projection zoom lens according to Example 1.

As shown in FIG. 2, during zooming, the first lens group $G_1$, the second lens group $G_2$, and the sixth lens group $G_6$ are formed as fixed groups, and the third to fifth lens group $G_3$ to $G_5$ are formed as movable groups.

Further, the aperture (the variable aperture stop) 3 is disposed between the fourth lens group $G_4$ and the fifth lens group $G_5$, and is configured to remain stationary during zooming.

Further, the zoom lens is substantially telecentric on the reduction side.

Table 1 shows radius of curvatures R of the lens surfaces of the projection zoom lens, center thicknesses of the lenses and air spaces D between the lenses (hereinafter, those are referred to as "on-axis surface spacing"), refractive indices N of the lenses at the d-line, and Abbe numbers ν of the lenses at the d-line. Furthermore, in the table, each numeral represents the order from the magnification side (hereinafter the same in Tables 2 and 3).

Further, the lower part of Table 1 shows the spaces between the lens groups at the wide-angle end (WIDE), the middle position (MIDDLE), and the telephoto end (TELE) (in the case of focus at infinity: hereinafter the same in Tables 2 and 3).

Furthermore, the lower part of Table 1 shows that the aperture diameter (the diameter of the aperture stop) of the aperture (the variable aperture stop) 3 is 0.486 at any of the wide-angle end (WIDE), the middle position (MIDDLE), and the telephoto end (TELE). In this example, it is apparent that, even during zooming, the speed (F number) of the lens is configured not to be changed.

TABLE 1

FOCAL LENGTH: F = 1.00~1.16~1.29

| SURFACE NUMBER | R | D | $N_d$ | $v_d$ |
|---|---|---|---|---|
| 1 | 4.461 | 0.333 | 1.7725 | 49.6 |
| 2 | 122.899 | 0.008 | | |
| 3 | 3.619 | 0.100 | 1.4970 | 81.5 |
| 4 | 1.793 | 0.283 | | |
| 5 | 5.130 | 0.084 | 1.4970 | 81.5 |
| 6 | 2.114 | 0.417 | | |
| 7 | −3.026 | 0.074 | 1.8052 | 25.4 |
| 8 | −451.435 | 0.248 | | |
| 9 | 8.227 | 0.241 | 1.5174 | 52.4 |
| 10 | −2.803 | 0.008 | | |
| 11 | 8.670 | 0.066 | 1.4970 | 81.5 |
| 12 | 1.722 | 0.272 | | |
| 13 | −2.401 | 0.070 | 1.4970 | 81.5 |
| 14 | 3.299 | (MOVEMENT 1) | | |
| 15 | −3.495 | 0.060 | 1.8010 | 35.0 |
| 16 | 2.060 | 0.291 | 1.5955 | 39.2 |
| 17 | −2.290 | 0.234 | | |
| 18 | 3.023 | 0.190 | 1.0477 | 33.8 |
| 19 | −7.460 | (MOVEMENT 2) | | |
| 20 | 3.518 | 0.145 | 1.4970 | 81.5 |
| 21 | −17.957 | (MOVEMENT 3) | | |
| 22 (APERTURE STOP) | ∞ | (MOVEMENT 4) | | |
| 23 | 2.606 | 0.052 | 1.5814 | 40.7 |
| 24 | 1.656 | 0.309 | | |
| 25 | −1.087 | 0.058 | 1.8348 | 42.7 |
| 26 | 8.614 | 0.233 | 1.4970 | 81.5 |
| 27 | −1.514 | 0.006 | | |
| 28 | 149.785 | 0.316 | 1.4388 | 94.9 |
| 29 | −1.600 | 0.006 | | |
| 30 | 10.527 | 0.237 | 1.4970 | 81.5 |
| 31 | −2.366 | (MOVEMENT 5) | | |
| 32 | 3.187 | 0.178 | 1.4970 | 81.5 |
| 33 | −29.588 | 1.644 | | |
| 34 | ∞ | 1.541 | 1.5163 | 64.1 |
| 35 | ∞ | | | |

| | | WIDE | MIDDLE | TELE |
|---|---|---|---|---|
| MOVEMENT SPACE | MOVEMENT 1 | 0.616 | 0.455 | 0.380 |
| | MOVEMENT 2 | 2.159 | 1.499 | 1.009 |
| | MOVEMENT 3 | 0.100 | 0.922 | 1.486 |
| | MOVEMENT 4 | 0.895 | 0.512 | 0.216 |
| | MOVEMENT 5 | 0.050 | 0.432 | 0.729 |
| DIAMEER OF APERURE STOP | | 0.486 | 0.486 | 0.486 |

The projection zoom lens according to Example 1 is configured to satisfy all the Conditional Expressions (1) to (4), (1'), (1"), and (2') as shown in Table 4.

Figure 7:
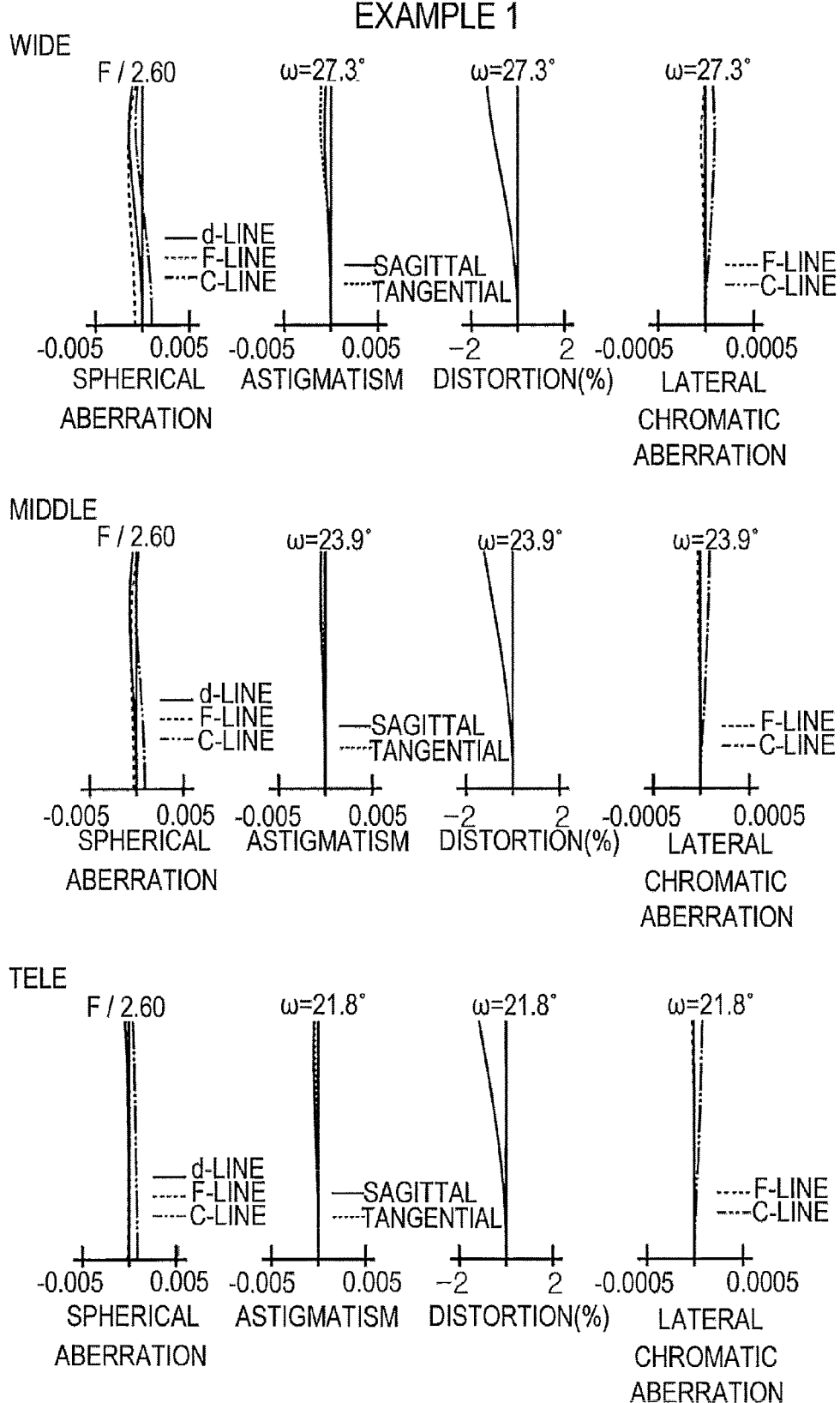
FIG. 7 is a diagram illustrating various aberrations of the projection zoom lens according to Example 1, at the wide-angle end (WIDE), the middle position (MIDDLE), and the telephoto end (TELE)

Further, FIG. 7 is an aberration diagram illustrating spherical aberrations, astigmatisms, distortions, and lateral chromatic aberrations of the projection zoom lens according to Example 1 at the wide-angle end (WIDE), the middle position (MIDDLE), and the telephoto end (TELE). Furthermore, each astigmatism diagram shows aberrations relative to the sagittal image plane and the tangential image plane (the same in FIGS. 8 and 9).

As can be clearly seen from the aberration diagrams, by using the projection zoom lens according to Example 1, it is possible to greatly reduce the amount of fluctuation in various aberrations such as spherical aberration and astigmatism caused by the zooming operation. In addition, it is possible to correct the various aberrations satisfactorily.

Further, in the projection zoom lens according to Example 1, all the F numbers at the wide-angle end (WIDE), the middle position (MIDDLE), and the telephoto end (TELE) are set to 2.60, and the amount of fluctuation in the F numbers caused by the zooming operation are set to approximately 0.

Example 2

Figure 3:
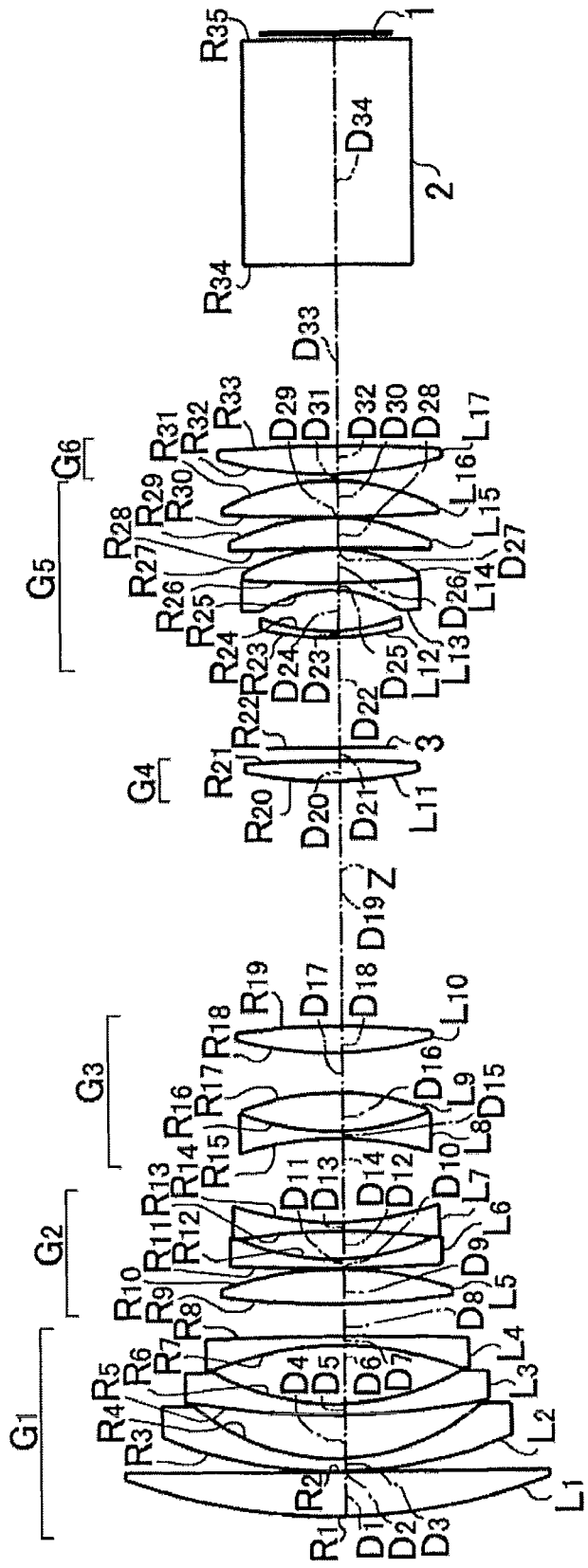
FIG. 3 is a lens configuration diagram of a projection zoom lens according to Example 2.

FIG. 3 shows a schematic configuration of the projection zoom lens according to Example 2. The projection zoom lens has a six-group configuration substantially the same as that of Example 1. However, the projection zoom lens is different in that the fifteenth lens $L_{15}$ constituting the fifth lens group $G_5$ is formed as a positive meniscus lens convex toward the reduction side.

Figure 4:
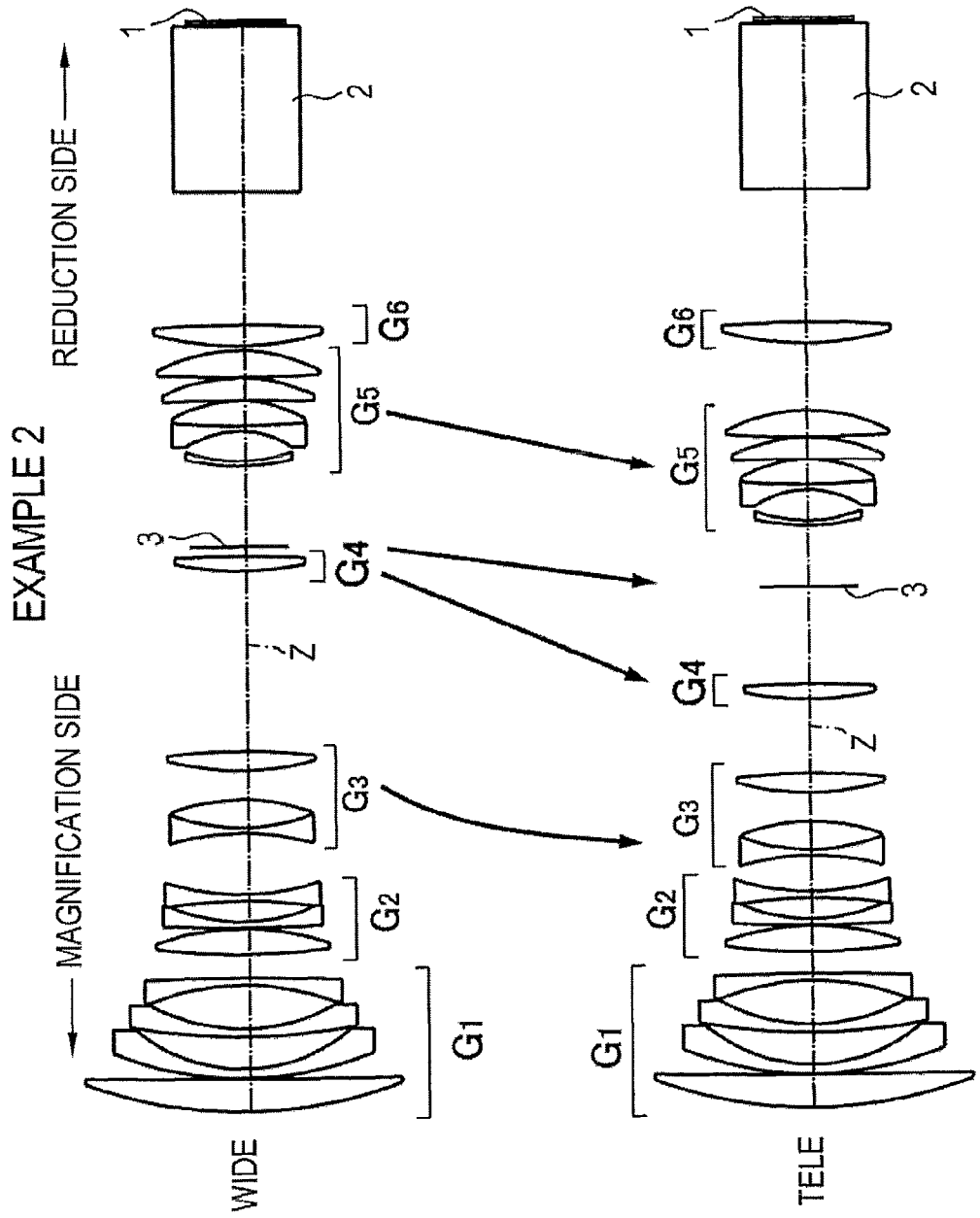
FIG. 4 is a diagram illustrating moved positions of lens groups of the projection zoom lens according to Example 2, at the wide-angle end (WIDE) and the telephoto end (TELE)

FIG. 4 shows moved positions of the lens groups at the wide-angle end (WIDE) and the telephoto end (TELE) in the projection zoom lens according to Example 2.

As shown in FIG. 4, during zooming, the first lens group $G_1$, the second lens group $G_2$, and the sixth lens group $G_6$ are formed as fixed groups, and the third to fifth lens group $G_3$ to $G_5$ are formed as movable groups.

Further, the aperture (the variable aperture stop) 3 is disposed between the fourth lens group $G_4$ and the fifth lens group $G_5$. During zooming from the wide-angle end to the telephoto end, the aperture is moved from the reduction side to the magnification side so as to make the amount of fluctuation in the F number equal to approximately 0.

Further, the zoom lens is substantially telecentric on the reduction side.

Table 2 shows radius of curvatures R of the lens surfaces of the projection zoom lens, on-axis surface spacings of the lenses D, refractive indices N of the lenses at the d-line, and Abbe numbers ν of the lenses at the d-line.

Further, the lower part of Table 2 shows the spaces between the lens groups at the wide-angle end (WIDE), the middle position (MIDDLE), and the telephoto end (TELE).

Furthermore, the lower part of Table 2 shows that the aperture diameter (the diameter of the aperture stop) of the aperture (the variable aperture stop) 3 is 0.556 at any of the wide-angle end (WIDE), the middle position (MIDDLE), and the telephoto end (TELE). In this example, it is apparent that, even during zooming, the speed (F number) of the lens is configured not to be changed.

TABLE 2

FOCAL LENGTH: F = 1.00~1.20~1.30

| SURFACE NUMBER | R | D | $N_d$ | $\nu_d$ |
|---|---|---|---|---|
| 1 | 5.170 | 0.370 | 1.7725 | 49.6 |
| 2 | 115.079 | 0.009 | | |
| 3 | 3.892 | 0.107 | 1.4970 | 81.5 |
| 4 | 1.882 | 0.362 | | |
| 5 | 7.000 | 0.090 | 1.4970 | 81.5 |
| 6 | 2.180 | 0.487 | | |
| 7 | −2.886 | 0.079 | 1.8081 | 22.8 |
| 8 | −34.641 | 0.265 | | |
| 9 | 7.148 | 0.289 | 1.5330 | 48.8 |
| 10 | −3.026 | 0.009 | | |
| 11 | 17.560 | 0.071 | 1.4970 | 81.5 |

TABLE 2-continued

FOCAL LENGTH: F = 1.00~1.20~1.30

| | | | | |
|---|---|---|---|---|
| 12 | 2.040 | 0.231 | | |
| 13 | −5.901 | 0.075 | 1.4970 | 81.5 |
| 14 | 2.790 | (MOVEMENT 1) | | |
| 15 | −2.991 | 0.064 | 1.8449 | 38.6 |
| 16 | 2.215 | 0.318 | 1.6158 | 36.4 |
| 17 | −2.271 | 0.327 | | |
| 18 | 3.039 | 0.219 | 1.6119 | 36.8 |
| 19 | −7.388 | (MOVEMENT 2) | | |
| 20 | 3.514 | 0.170 | 1.4388 | 94.9 |
| 21 | −13.731 | (MOVEMENT 3) | | |
| 22 (APERTURE STOP) | ∞ | (MOVEMENT 4) | | |
| 23 | 2.467 | 0.056 | 1.5800 | 40.0 |
| 24 | 1.640 | 0.347 | | |
| 25 | −1.096 | 0.062 | 1.8165 | 42.2 |
| 26 | 8.670 | 0.283 | 1.4970 | 81.5 |
| 27 | −1.505 | 0.007 | | |
| 28 | −23.916 | 0.252 | 1.4970 | 81.5 |
| 29 | −1.962 | 0.006 | | |
| 30 | 15.360 | 0.302 | 1.4388 | 94.9 |
| 31 | −1.997 | (MOVEMENT 5) | | |
| 32 | 3.518 | 0.234 | 1.4970 | 81.5 |
| 33 | −14.076 | 1.552 | | |
| 34 | ∞ | 1.861 | 1.5163 | 64.1 |
| 35 | ∞ | | | |

| | | WIDE | MIDDLE | TELE |
|---|---|---|---|---|
| MOVEMENT SPACE | MOVEMENT 1 | 0.686 | 0.468 | 0.404 |
| | MOVEMENT 2 | 2.030 | 1.230 | 0.837 |
| | MOVEMENT 3 | 0.106 | 0.798 | 1.091 |
| | MOVEMENT 4 | 0.921 | 0.770 | 0.701 |
| | MOVEMENT 5 | 0.053 | 0.530 | 0.764 |
| DIAMEER OF APERURE STOP | | 0.556 | 0.556 | 0.556 |

The projection zoom lens according to Example 2 is configured to satisfy all the Conditional Expressions (1) to (4), (1'), (1''), and (2') as shown in Table 4.

Figure 8:
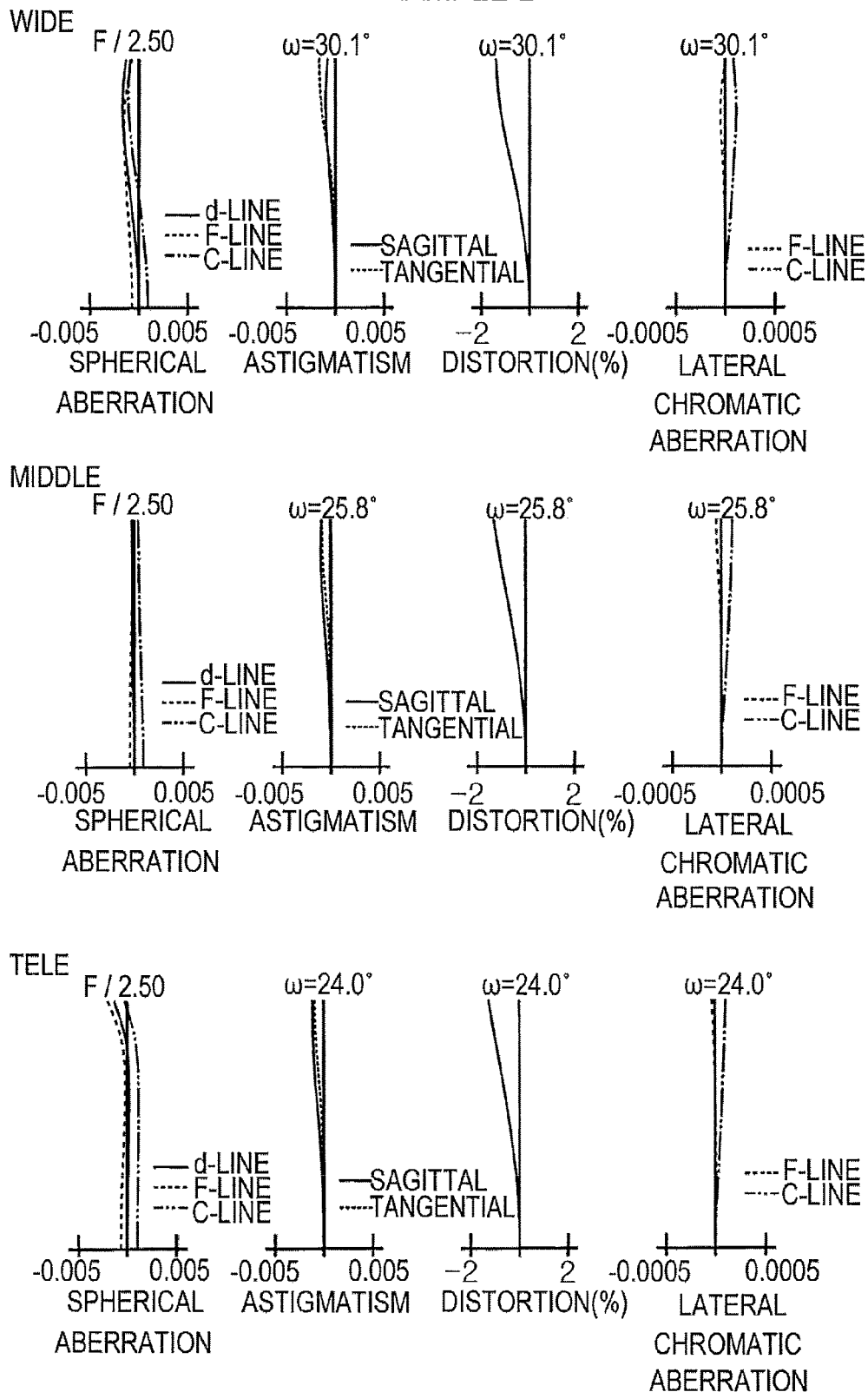
FIG. 8 is a diagram illustrating various aberrations of the projection zoom lens according to Example 2, at the wide-angle end (WIDE), the middle position (MIDDLE), and the telephoto end (TELE)

Further, FIG. 8 is an aberration diagram illustrating spherical aberrations, astigmatisms, distortions, and lateral chromatic aberrations of the projection zoom lens according to Example 2 at the wide-angle end (WIDE), the middle position (MIDDLE), and the telephoto end (TELE).

As can be clearly seen from the aberration diagrams, by using the projection zoom lens according to Example 2, it is possible to greatly reduce the amount of fluctuation in various aberrations such as spherical aberrations and astigmatism caused by the zooming operation. In addition, it is possible to correct the various aberrations satisfactorily.

Further, in the projection zoom lens according to Example 2, all the F numbers at the wide-angle end (WIDE), the middle position (MIDDLE), and the telephoto end (TELE) are set to 2.50, and the amount of fluctuation in the F numbers caused by the zooming operation are set to approximately 0.

Example 3

Figure 5:
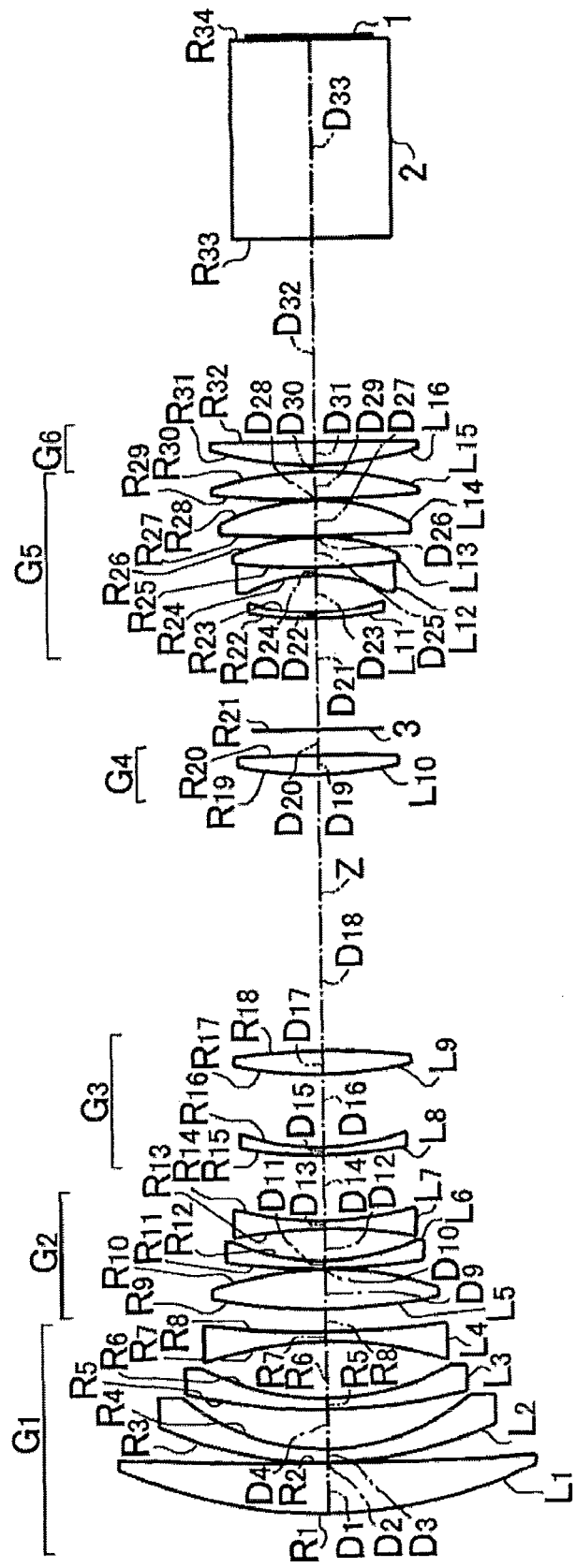
FIG. 5 is a lens configuration diagram of a projection zoom lens according to Example 3.

FIG. 5 shows a schematic configuration of the projection zoom lens according to Example 3. The projection zoom lens has a six-group configuration substantially the same as that of Example 1. However, the projection zoom lens is different in the following points. First, the fourth lens $L_4$ constituting the first lens group $G_1$ is formed as a biconcave lens. Second, the third lens group $G_3$ includes, in order from the magnification side: the eighth lens $L_8$ formed as a negative meniscus lens convex toward the magnification side; and the ninth lens $L_9$ formed as a biconvex lens. Third, the sixteenth lens $L_{16}$ constituting the sixth lens group $G_6$ is formed as a piano-convex lens convex toward the magnification side. Furthermore, the fourth lens group $G_4$ includes only the tenth lens $L_{10}$, and the fifth lens group $G_5$ includes the five lenses $L_{11}$ to $L_{15}$.

Figure 6:
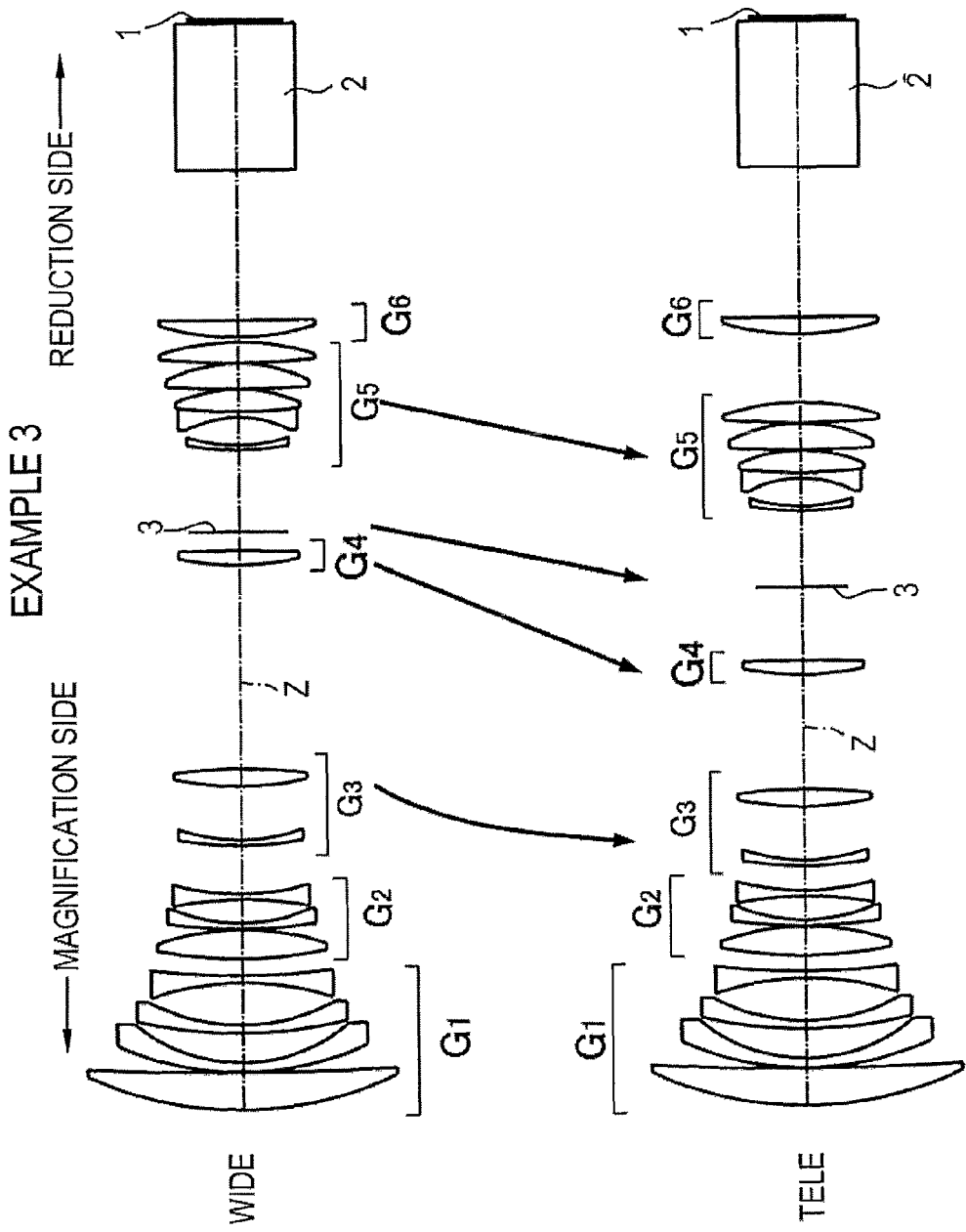
FIG. 6 is a diagram illustrating moved positions of lens groups of the projection zoom lens according to Example 3, at the wide-angle end (WIDE) and the telephoto end (TELE)

FIG. 6 shows moved positions of the lens groups at the wide-angle end (WIDE) and the telephoto end (TELE) in the projection zoom lens according to Example 3.

As shown in FIG. 6, during zooming, the first lens group $G_1$, the second lens group $G_2$, and the sixth lens group $G_6$ are formed as fixed groups, and the third to fifth lens group $G_3$ to $G_5$ are formed as movable groups.

Further, the aperture (the variable aperture stop) 3 is disposed in the fourth lens group $G_4$. During zooming, the aperture is independently moved in conjunction with the fourth lens group $G_4$ so as to make the amount of fluctuation in F number equal to approximately 0.

Further, the zoom lens is substantially telecentric on the reduction side.

Table 3 shows radius of curvatures R of the lens surfaces of the projection zoom lens, on-axis surface spacings D of the lenses, refractive indices N of the lenses at the d-line, and Abbe numbers ν of the lenses at the d-line.

Further, the lower part of Table 3 shows the spaces between the lens groups at the wide-angle end (WIDE), the middle position (MIDDLE), and the telephoto end (TELE).

Furthermore, the lower part of Table 3 shows that the aperture diameter (the diameter of the aperture stop) of the aperture (the variable aperture stop) 3 is 0.520 at any of the wide-angle end (WIDE), the middle position (MIDDLE), and the telephoto end (TELE). In this example, it is apparent that, even during zooming, the speed (F number) of the lens is configured not to be changed.

TABLE 3

FOCAL LENGTH: F = 1.00~1.16~1.29

| SURFACE NUMBER | R | D | $N_d$ | $\nu_d$ |
|---|---|---|---|---|
| 1 | 3.897 | 0.392 | 1.8040 | 46.6 |
| 2 | 30.901 | 0.008 | | |
| 3 | 3.205 | 0.100 | 1.4970 | 81.5 |
| 4 | 1.769 | 0.309 | | |
| 5 | 4.786 | 0.084 | 1.4970 | 81.5 |
| 6 | 2.077 | 0.444 | | |
| 7 | -3.079 | 0.074 | 1.8052 | 25.4 |
| 8 | 7.559 | 0.176 | | |
| 9 | 4.512 | 0.304 | 1.5174 | 52.4 |
| 10 | -2.792 | 0.008 | | |
| 11 | 5.259 | 0.060 | 1.4970 | 81.5 |
| 12 | 1.803 | 0.248 | | |
| 13 | -3.935 | 0.060 | 1.4970 | 81.5 |
| 14 | 2.613 | (MOVEMENT 1) | | |
| 15 | 3.622 | 0.060 | 1.8061 | 33.3 |
| 16 | 1.953 | 0.564 | | |
| 17 | 3.260 | 0.182 | 1.6990 | 30.1 |
| 18 | -5.590 | (MOVEMENT 2) | | |
| 19 | 2.944 | 0.149 | 1.4970 | 81.5 |
| 20 | -18.899 | (MOVEMENT 3) | | |
| 21 | ∞ | (MOVEMENT 4) | | |
| 22 (APERTURE STOP) | 2.863 | 0.052 | 1.5955 | 39.2 |
| 23 | 1.773 | 0.295 | | |
| 24 | -1.199 | 0.058 | 1.8348 | 42.7 |
| 25 | 5.252 | 0.237 | 1.4970 | 81.5 |
| 26 | -1.634 | 0.006 | | |
| 27 | 13.464 | 0.280 | 1.4388 | 94.9 |
| 28 | -1.668 | 0.006 | | |
| 29 | 8.843 | 0.217 | 1.4970 | 81.5 |
| 30 | -2.690 | (MOVEMENT 5) | | |
| 31 | 2.788 | 0.179 | 1.4970 | 81.5 |
| 32 | ∞ | 1.582 | | |
| 33 | ∞ | 1.538 | 1.5163 | 64.1 |
| 34 | ∞ | | | |

TABLE 3-continued

FOCAL LENGTH: F = 1.00~1.16~1.29

| | | WIDE | MIDDLE | TELE |
|---|---|---|---|---|
| MOVEMENT SPACE | MOVEMENT 1 | 0.509 | 0.329 | 0.260 |
| | MOVEMENT 2 | 2.143 | 1.628 | 1.208 |
| | MOVEMENT 3 | 0.099 | 0.487 | 0.767 |
| | MOVEMENT 4 | 0.968 | 0.882 | 0.803 |
| | MOVEMENT 5 | 0.050 | 0.443 | 0.731 |
| DIAMEER OF APERURE STOP | | 0.520 | 0.520 | 0.520 |

The projection zoom lens according to Example 3 is configured to satisfy all the Conditional Expressions (1) to (4), (1'), and (2') as shown in Table 4.

Figure 9:
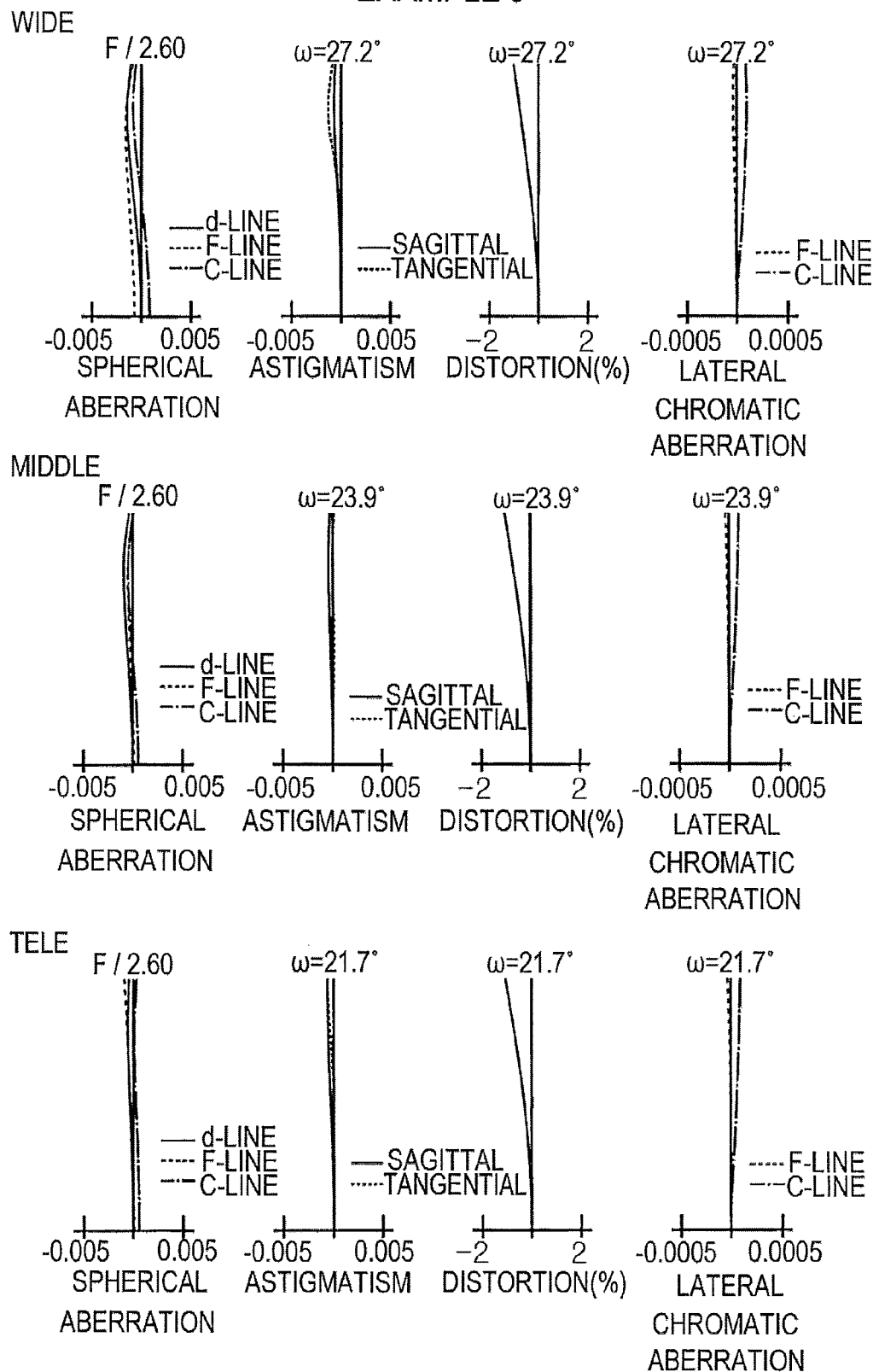
FIG. 9 is a diagram illustrating various aberrations of the projection zoom lens according to Example 3, at the wide-angle end (WIDE), the middle position (MIDDLE), and the telephoto end (TELE)

Further, FIG. 9 is an aberration diagram illustrating spherical aberrations, astigmatisms, distortions, and lateral chromatic aberrations of the projection zoom lens according to Example 3 at the wide-angle end (WIDE), the middle position (MIDDLE), and the telephoto end (TELE).

As can be clearly seen from the aberration diagrams, by using the projection zoom lens according to Example 3, it is possible to greatly reduce the amount of fluctuation in various aberrations such as spherical aberration and astigmatism caused by the zooming operation. In addition, it is possible to correct the various aberrations satisfactorily.

Further, in the projection zoom lens according to Example 3, all the F numbers at the wide-angle end (WIDE), the middle position (MIDDLE), and the telephoto end (TELE) are set to 2.60, and the amount of fluctuation in the F numbers caused by the zooming operation are set to approximately 0.

TABLE 4

| | (1), (1'), (1") f2/fw | (2), (2') Bf/fw | (3) ν d4 | (4) ν d5 |
|---|---|---|---|---|
| EXAMPLE 1 | -3.06 | 2.65 | 81.5 | 94.9, 81.5 |
| EXAMPLE 2 | -4.69 | 2.77 | 94.9 | 94.9, 81.5 |
| EXAMPLE 3 | -5.87 | 2.59 | 81.5 | 94.9, 81.5 |

Further, the projection zoom lens according to the embodiment of the invention is not limited to the examples mentioned above, and may be modified into various forms. For example, it may be possible to properly modify the radius of curvatures R of the lenses and the on-axis surface spacings D.

Furthermore, the projection-type display apparatus according to the invention is not limited to the configurations mentioned above, and may be modified to various forms of apparatuses having the wide-angle projection zoom lens according to the invention. As the light valve, it may be possible to use a transmissive or reflective liquid crystal display device, or a micro mirror element (for example, a digital micro mirror device manufactured by Texas Instruments Co.) in which a plurality of inclinable micro mirrors are formed on a substantially flat surface. As the illumination optical system, it may be possible to employ a proper configuration corresponding to types of the light valves.

What is claimed is:

1. A projection zoom lens for projecting an optical image of rays, which are irradiated from a light source onto a light valve and are modulated by a predetermined image displayed on the light valve, onto a screen, the projection zoom lens comprising:

a plurality of lens groups that is formed as a telecentric system on a reduction side thereof and includes at least two movable lens groups which are movable during zooming, wherein the plurality of lens groups is arranged to include, in order from a magnification side, at least a first lens group that has a negative refractive power, remains stationary during zooming, and performs focusing, and a second lens group that has a negative refractive power and remains stationary during zooming and focusing.

2. The projection zoom lens according to claim 1, wherein the plurality of lens groups includes, in order from the second lens group toward the reduction side, a third lens group that has a positive refractive power and is movable along an optical axis during zooming, a fourth lens group that has a positive refractive power and is movable along the optical axis during zooming, a fifth lens group that has a positive or negative refractive power and is movable along the optical axis during zooming, and a sixth lens group that has a positive refractive power and remains stationary during zooming.

3. The projection zoom lens according to claim 2, wherein the third lens group, the fourth lens group, and the fifth lens group are movable from the reduction side to the magnification side during zooming from a wide-angle end to a telephoto end.

4. The projection zoom lens according to claim 1, wherein the following Conditional Expression (1) is satisfied:

$$-7.0 < f_2/fw < -2.0 \qquad (1),$$

where
fw is a focal length of the whole lens system at the wide-angle end, and
$f_2$ is a focal length of the second lens group.

5. The projection zoom lens according to claim 1, wherein the following Conditional Expression (2) is satisfied:

$$1.5 < Bf/fw < 4.0 \qquad (2),$$

where
fw is a focal length of the whole lens system at the wide-angle end, and
Bf is an air-converted back focal length of the whole lens system.

6. The projection zoom lens according to claim 2, wherein the fourth lens group is formed of a single biconvex lens, and satisfies the following Conditional Expression (3):

$$70 < vd4 \qquad (3),$$

where
vd4 is an Abbe number of the biconvex lens constituting the fourth lens group at the d-line.

7. The projection zoom lens according to claim 1, wherein the following Conditional Expression (4) is satisfied:

$$70 < vd5 \qquad (4),$$

where
vd5 is an Abbe number of a positive lens convex toward the reduction side in the fifth lens group at the d-line.

8. The projection zoom lens according to claim 2, wherein in the entire zooming range, an aperture, which remains stationary during zooming so as to keep an F number constant, is disposed between the fourth lens group and the fifth lens group.

9. The projection zoom lens according to claim 2, wherein in the entire zooming range, an aperture, which is independently movable so as to keep an F number constant, is disposed between the fourth lens group and the fifth lens group.

10. A projection-type display apparatus comprising the projection zoom lens according to claim 1 and further comprising:
  the projection zoom lens being telecentric on the reduction side thereof;
  a light source;
  a light valve;
  an illumination optical unit that guides rays originated from the light source into the light valve; and
  wherein the rays originated from the light source are optically modulated by the light valve, and are projected onto a screen by the projection zoom lens.

* * * * *